Figure 1:
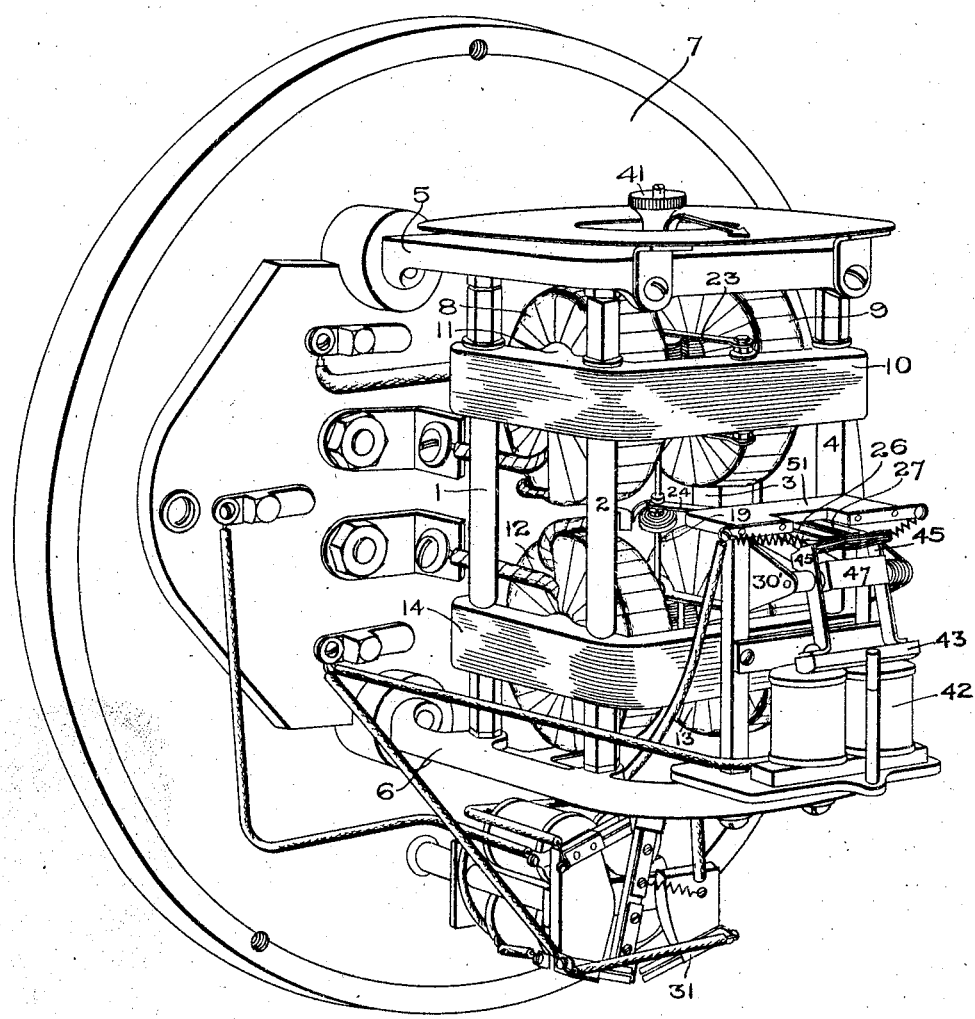

No. 768,344. PATENTED AUG. 23, 1904.
W. H. PRATT.
MEANS FOR CONTROLLING ELECTRIC METERS.
APPLICATION FILED JAN. 20, 1903.
NO MODEL. 3 SHEETS—SHEET 1.

Witnesses:
George A. Thornton
Helen Orford

Inventor:
William H. Pratt,
by Allen B. Davis
Atty.

No. 768,344. PATENTED AUG. 23, 1904.
W. H. PRATT.
MEANS FOR CONTROLLING ELECTRIC METERS.
APPLICATION FILED JAN. 20, 1903.
NO MODEL. 3 SHEETS—SHEET 2.
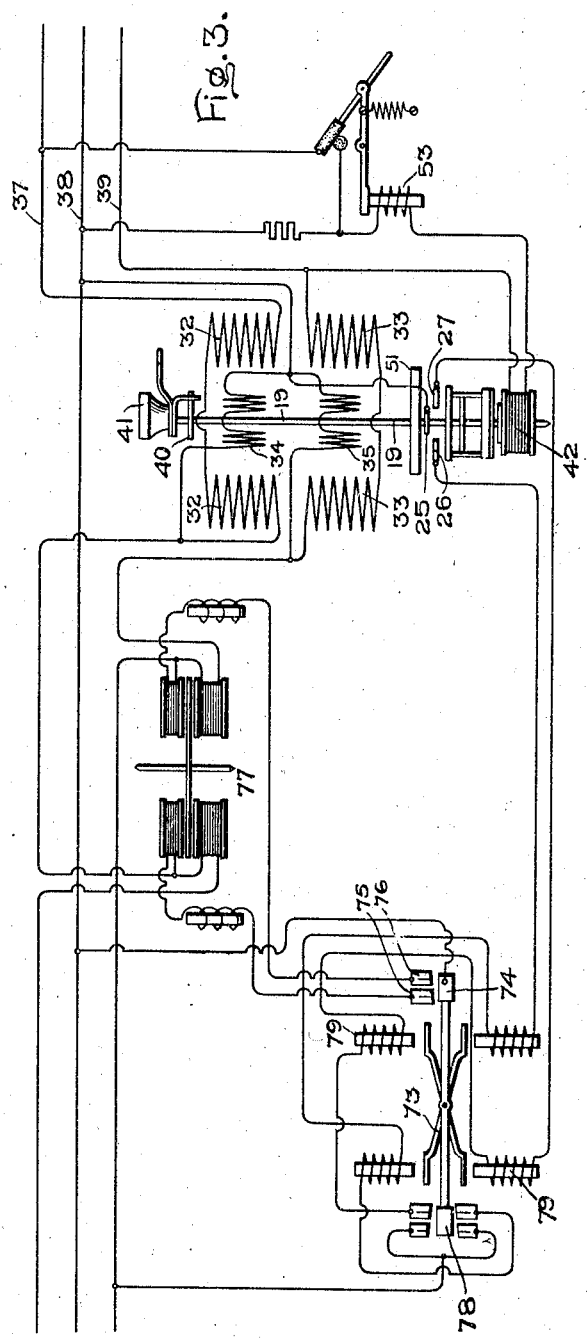
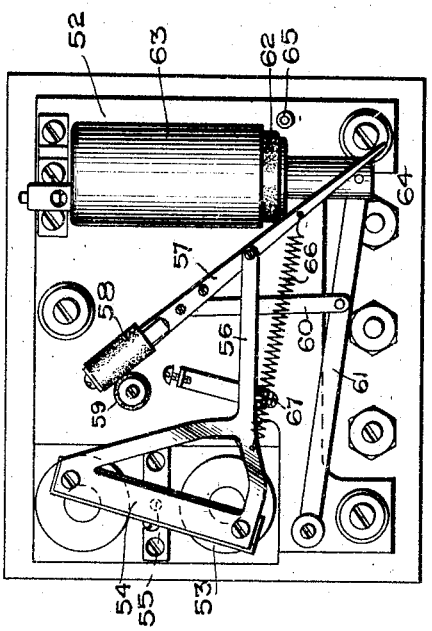
Witnesses:
George A. Thornton
Helen Oxford
Inventor
William H. Pratt,
by Allen K. Davis
Att'y.

No. 768,344. PATENTED AUG. 23, 1904.
W. H. PRATT.
MEANS FOR CONTROLLING ELECTRIC METERS.
APPLICATION FILED JAN. 20, 1903.
NO MODEL. 3 SHEETS—SHEET 3.
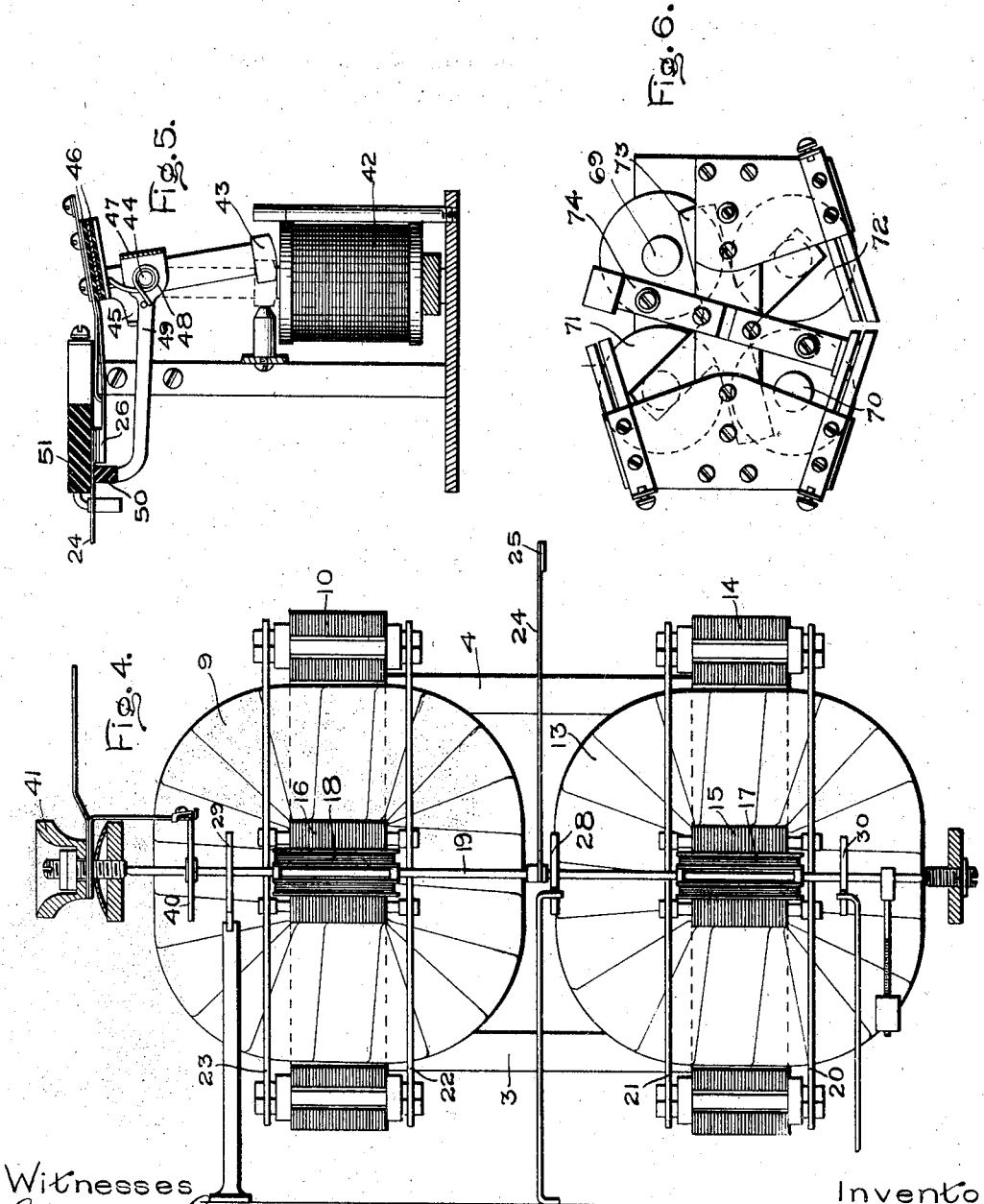
Witnesses
George A. Thornton.
Helen Oxford
Inventor
William H Pratt,
by
Att'y.

No. 768,344.

Patented August 23, 1904.

UNITED STATES PATENT OFFICE.

WILLIAM H. PRATT, OF LYNN, MASSACHUSETTS, ASSIGNOR TO GENERAL ELECTRIC COMPANY, A CORPORATION OF NEW YORK.

MEANS FOR CONTROLLING ELECTRIC METERS.

SPECIFICATION forming part of Letters Patent No. 768,344, dated August 23, 1904.

Application filed January 20, 1903. Serial No. 139,830. (No model.)

*To all whom it may concern:*

Be it known that I, WILLIAM H. PRATT, a citizen of the United States, residing at Lynn, county of Essex, State of Massachusetts, have invented certain new and useful Improvements in Means for Controlling Electric Meters, of which the following is a specification.

My invention relates to electric meters, and comprises means whereby a meter or meters may be so controlled as to measure the energy of a circuit at such times only as the rate of flow of energy is within certain predetermined limits. Thus, for example, my invention is useful in cases where a certain flat rate is charged for current when the amount of current flowing at any one time does not exceed a certain amount and a certain other rate when the flow of energy is in excess of the fixed amount or limit. A meter or meters arranged in accordance with my invention may thus serve to measure the total amount of energy flowing only during such period or periods as the flow of energy is in excess of a predetermined rate.

The meter-controlling mechanism which I employ is made up of a number of coöperating devices, the more prominent of which is an electrodynamometer for indicating the amount of energy flowing. This electrodynamometer through certain coöperating circuit-closing devices operates to cut an electric meter into circuit when the number of watts being consumed is in excess of a certain amount and to cut the meter out of circuit when the rate of consumption of energy is less than the fixed amount.

My invention is intended more particularly for use in connection with polyphase electric circuits; but it will be evident that its various features of novelty are capable of useful applications in other relations than the particular one mentioned.

The features of novelty I have endeavored to point out with particularity in the appended claims, while the invention itself as to its details of construction and mode of operation is set forth more at length in the following description, which is to be taken in connection with the accompanying drawings, in which—

Figure 1 is a perspective view of what I may term a "polyphase relay" built in accordance with my invention. Fig. 2 is a view of a periodically-operating circuit making and breaking device to be used in connection with the arrangement shown in Fig. 1. Fig. 3 is a diagram of the circuits of an apparatus arranged in accordance with my invention, and Figs. 4, 5, and 6 are views of details of the apparatus shown in Fig. 1.

As before mentioned, the more prominent feature of the apparatus is the polyphase relay, this relay consisting of a species of dynamometer instrument having two fixed coils or current-carrying members arranged for connection, respectively, with two of the three mains of the three-phase system, coöperating with which members are corresponding potential-coils, mounted within the influence of the current-coils and carried upon the same spindle. A contact-carrying arm is carried by the spindle. The position of the contact depends upon the torque of the dynamometer as compared with the restraining torque of an adjustable spring. By adjusting this spring the contact may be arranged so that when the energy or, in other words, the watts of the multiphase circuit reaches or exceeds a certain amount the contact operates through adjunctive circuit-changing devices to throw into circuit a suitable polyphase meter, the meter being thrown out of circuit at other times.

In Fig. 1 the dynamometer instrument above mentioned is a somewhat rectangular arrangement mounted upon the four uprights 1, 2, 3, and 4, which in turn are supported from the horizontal brackets 5 and 6, bolted to the base-plate 7 of the instrument. One set of current-coils is indicated at 8 and 9, and in order that the field produced by these coils shall not only be as strong as possible, but also shielded from external stray fields, I surround the coils by a mass of laminated magnetic material 10, having inwardly-projecting pole-pieces, as at 11, upon which the coils are mounted. The current-coils 12 and 13 of the other dynamometer element are similarly mounted upon inwardly-projecting pole-pieces formed integral with a body 14 of punched-out sheets of magnetic material similar to the mass or core 10. A view of the magnetic field structure for the current-coils is represented in cross-section in Fig. 4.

Between the inwardly-projecting pole-pieces of the laminated cores 10 and 14 are mounted, respectively, two substantially cylindrical bodies of laminated iron, (indicated in Fig. 4, at 15 and 16,) the arrangement being such that the movable coils 17 18, mounted on the spindle 19, swing in annular spaces, in each of which exists a strong magnetic field due to the current-coils of the instrument. The cylindrical blocks of magnetic material 15 and 16, around which swing the movable coils of the instrument, are supported in place by cross-bars 20, 21, 22, and 23, fixed, as indicated in Figs. 1 and 4, to the respective laminated cores 10 and 14, though of course any other suitable method of support may be employed if desired.

The spindle or shaft 19 of the movable member of the dynamometer carries an arm 24, the outer end 25 of which is adapted to engage one or the other of two movable contacts indicated at 26 and 27 in Fig. 1, one of which is shown more in detail at 26 in Fig. 5. Current is conveyed to the movable contact 25 and also to the movable coils 17 and 18 by means of spiral springs, one of which is indicated at 28 in Fig. 4, to which the contact 25 and one end of each of the coils 17 and 18 are all connected, and two others at 29 and 30, to which the remaining ends of the two potential-coils 17 and 18 are connected.

The dynomometer instrument above described might be used as the direct means for cutting the electric meter controlled thereby into or out of circuit; but such an arrangement would be unsatisfactory, both because of the poor contact which would be afforded and the attendant sparking and other difficulties due to trembling engagement of the contacts and to the light pressure thereof, except in cases where the dynamometer be made of excessive size.

To overcome the difficulties mentioned, I arrange the apparatus so that the movable contact 25 is adapted to move over the two coöperating contacts 26 and 27, which are pivotally mounted at 30' and adapted to be moved periodically by magnetic means into the path traversed by the movable contact 25, carried by the dynamometer. If this latter contact is in one of its extreme positions or at least away from its central position, it is engaged by one of the contacts 26 and 27, and if on the opposite side of its central position it is engaged by the other. Electrical connections are provided whereby when one of the contacts, as 26, is engaged a magnetic switch (indicated at 31) is thrown into a position such as to close the potential-circuits of an induction-meter, while when the other contact, 27, is engaged the magnetic switch 31 is moved into its opposite position, thereby opening the potential-circuits of the meter.

Before proceeding to describe in detail the various devices used in connection with the dynamometer it may for the sake of clearness be better to refer to Fig. 3, which is a conventional representation of the circuits of the system as a whole. In this figure the two sets of current-coils of the dynamometer are indicated at 32 and 33. The corresponding potential-coils are indicated at 34 and 35, these coils being supposed to be mounted upon the vertical shaft 19. One set of current-coils, 32, is connected in series with one of the mains, 37, of the three-phase system represented conventionally by the set of mains 37, 38, and 39. The other set of current-coils 33 is connected in series with another of the three-phase mains, 39. Of the two potential-coils 34 and 35, it will be noted that the coil 34 is connected between the third main 38 and the main 37 and the other between the main 38 and the remaining main 39. The torque of the instrument as thus connected will, as is well understood in the art, represent the total energy flowing in the three-phase mains. Current flowing in the instrument tends to move the rotatable member carrying the contact 25 in one direction, and a spring—shown, for example, at 40 in Fig. 4—opposes the turning moment due to the current. By adjusting the tension of this spring 40 by means of the milled head or screw 41 the movable member of the dynamometer may be caused to occupy a central or neutral position at some particularly chosen load on the three-phase mains. When the load increases above this amount, the contact 25 moves to one side of the central position, while when the load is less than the fixed amount it is moved to the other side, thereby assuming in either case a position opposite one or the other of the contacts 26 and 27, before referred to.

By means of a periodically-energized electromagnet, represented at 42 in Fig. 5 and by the same numeral in Fig. 1, the contacts 26 and 27 are moved into the path of the contact 25, whereby the latter contact is brought into engagement with whichever of the contacts 26 and 27 it happens to register. The means for effecting this result is shown somewhat in detail in Fig. 5. In this figure the magnet 42 will be seen to act upon an armature 43, pivoted about a shaft 44. The arms carrying the armature 43 project above the shaft 44, as indicated at 45, and carry contacts 26 and 27, which are firmly secured thereto but separated therefrom by suitable insulating material 46. The arms 45 are connected at the top by a yoke against which bears one end of a spring 48, wound about the shaft 44, and acting at its other end upon a pivoted member 49. This member has arms connected at one side of the shaft by a yoke 47 and at the other side by a cross-bar 50, of insulating material, such as hard fiber, adapted when the armature 43 is drawn down by the magnet 42 to be pressed yieldingly against a fixed platform or pressure-receiving surface 51, also of insulating material. When the magnet 42 is unenergized, the bar 50 is out of engagement with the pressure-receiving surface 51, leaving a space in which the end of the contact-carrying arm 24 is adapted to move freely back and forth. When the magnet 42 is energized, the end of this arm is immediately clamped against the pressure-receiving surface 51 by means of the bar 50, which action is immediately succeeded by the movement of the resilient contacts 26 and 27 toward the platform or pressure-receiving surface 51. The contact 25 on the end of the arm 24 intercepts the movement of one or the other of said contacts 26 and 27, and thereby completes a circuit through the switch-throwing device, (indicated in plan view in Fig. 1 and in perspective at the bottom of Fig. 1 at 31.)

The means whereby the magnet 42 is periodically energized may assume a variety of forms. One form which I have found suitable is shown in detail in Fig. 2. It consists of a suitable base 52, on which the working parts are mounted. An electromagnet is represented at 53, and coöperting therewith is an armature 54, pivoted about its middle point at 55. This armature is provided with an open framework having an arm 56, pivoted to a system of levers. The lever 57, which is pivoted to the lever 56, carries at one end a cylindrical carbon contact 58, adapted to make engagement with a similar contact 59, secured to the base 52. A link 60 connects the lever 57 with a pivoted lever 61, one end of which is adapted to communicate motion to the plunger 62 of a dash-pot 63. Let it be supposed that the magnet 53, the circuit of which is completed by the engagement of the contacts 58 and 59, be connected in series with the circuit to be energized and across the terminals of a suitable source of current. The lever 56 will immediately be raised, the adjustment of the dash-pot being such as to allow a quick upward movement, the contacts 58 and 59 sliding over each other until the lower end 64 comes into engagement with the stop 65, carried by the base 52. This engagement causes the contact 58 to be tilted out of engagement with the fixed contact 59, whereupon the parts return slowly by gravity to their original positions, the contact 58 being held away from the fixed contact 59 by means of a spring connection 66 between the levers 56 and 57, as indicated. When, however, the lever 56 comes into engagement with the stop 67, the further movement of the lever 61 downward operates, through the link 60, to draw down the upper end of the lever 57, thereby bringing the contact 58 against the contact 59, thus completing the circuit, whereupon the sequence of operations above described is repeated.

By reference to Fig. 3 the arrangement of circuits will perhaps be better understood. In this figure the magnet 53 of the device shown in Fig. 2 is represented by the same numeral, and this magnet, it will be noted, is in series with the magnet 42 of the circuit-closing device shown in detail in Fig. 5 and in perspective in Fig. 1. This circuit-closing device, the operation of which has already been described, completes the circuits of a switch-throwing device shown in detail in Fig. 6 and in perspective at 31 in Fig. 1. This device consists of two sets of magnets 69 70 and 71 72, provided with an armature fashioned in the form of a cross, as represented conventionally at 73 in Fig. 3 and more in detail by the same numeral in Fig. 6. Two of the diametrically-located magnets are energized when the contact 25 engages the coöperating contact 26 and the other pair when the contact 25 engages the coöperating contact 27. In one case let it be supposed that the armature 73 is moved so that the contact-carrying arm 74 in Fig. 6 is moved to the left or upward, as shown in Fig. 3, so as to close the circuit between the two fixed contacts 75 and 76, only one of which, the contact 75, is shown in the plan view in Fig. 6. This closes the potential-circuits of the induction-meter, (represented conventionally at 77,) the connections being such as to put the potential-coils into circuit with the mains 37, 38, and 39, as indicated, whereupon the meter commences to register. By the same movement of the switch-closing device the contact 78 opens the circuit of the previously-closed pair of magnets 79, thereby relieving the contact 25 of the dynamometer instrument of this duty and so preventing troublesome sparking. The remaining pair of magnets has its circuit closed by the contact 78 in readiness to be energized in case the contact 25 of the dynamometer instrument should move out of engagement with one of the contacts 26 27 and into engagement with the other.

What I claim as new, and desire to secure by Letters Patent of the United States, is—

1. The combination of a multiphase alternating-current circuit, a meter therefor provided with current and potential circuits, and means for respectively opening or closing the said potential circuits when the load on said multiphase circuit falls below or rises above a predetermined amount.

2. The combination of a multiphase alternating-current circuit, an induction-meter therefor, means for setting said meter in operation when the load on said multiphase circuit rises above a certain amount, and means for throwing said meter out of operative relation to said multiphase circuit when the load falls below said amount.

3. The combination with the movable member of an electrical indicating instrument, of a resilient arm carried thereby and having its outer end provided with a contact, a fixed pressure-receiving surface over which said contact is adapted to move in close proximity but out of engagement therewith, a series of coöperating contacts adapted to be periodically pressed against said pressure-receiving surface thereby causing a firm engagement between one of said coöperating contacts and the first-mentioned contact, and a switch-throwing device controlled by the engagement of said contacts.

4. In a contact making and breaking device, the combination of a plurality of periodically and simultaneously actuated contacts, a pressure-receiving surface against which said contacts are adapted to be periodically pressed, and a pivotally-mounted contact arranged to move freely in the space between said pressure-receiving surface and the first-mentioned contacts when the latter are out of engagement with said surface.

5. The combination of a pressure-receiving surface, a contact movable along said surface but out of engagement therewith, a plurality of contacts mounted so as to be movable into engagement with said pressure-receiving surface, thereby causing engagement between the first-mentioned contact and that one of the coöperating contacts with which it happens to register, and a circuit or circuits controlled by said engagement.

6. In a metering system for a multiphase circuit, the combination of a dynamometer for measuring energy flowing in said circuit, a contact carried by the movable element of the dynamometer, two coöperating contacts, means for periodically moving said two contacts into the path of the first-mentioned contact whereby the said first-mentioned contact is caused to engage one or the other of the coöperating contacts, a magnetic circuit-changing device controlled by engagement of said contacts, and a meter arranged to be thrown into or out of operative relation to said multiphase circuit through the instrumentality of said circuit-changing device.

7. The combination of a dynamometer, a contact-carrying arm secured to the movable member of said dynamometer, a plurality of coöperating contacts mounted so as to be capable of movement into the path of the contact on said contact-carrying arm, means for periodically advancing and withdrawing said coöperating contacts, and circuits controlled by the engagement of the contact on the contact-carrying arm with one or another of said coöperating contacts.

8. The combination of a pivotally-mounted contact, means for moving said contact backward and forward according to the variations in the amount of current flowing in an electric circuit, a series of contacts over which the pivoted contact is adapted to move, and means for periodically and simultaneously moving said series of contacts into the path of the pivotally-mounted contact.

In witness whereof I have hereunto set my hand this 17th day of January, 1903.

WILLIAM H. PRATT.

Witnesses:
DUGALD McK. McKILLOP,
JOHN A. McMANUS.